United States Patent Office 3,424,688
Patented Jan. 28, 1969

---

3,424,688
METHOD OF DESCALING OPEN WATER SYSTEMS
Marvin M. Boiko, Morton Grove, and Carl H. Schneider, Kankakee, Ill., assignors to Tri-Bros. Chemical Corporation, Morton Grove, Ill., a corporation of Illinois
No Drawing. Continuation-in-part of application Ser. No. 368,377, May 18, 1964. This application June 26, 1967, Ser. No. 649,017
U.S. Cl. 252—87  6 Claims
Int. Cl. C02b 5/00; C23g 1/02; C11d 7/08

---

ABSTRACT OF THE DISCLOSURE

A process for removing scale deposits from a water system by draining the system of water, introducing a solution of phosphoric acid in water having a concentration of about 7–45% phosphoric acid, allowing the solution to remain in the system to loosen the scale and then removing the solution and liberated scale. The process is particularly useful for open water systems from which fluid is to be withdrawn for use in or on the human body because the phosphoric acid is non-toxic.

---

This application is in part a continuation of our pending patent application Ser. No. 368,377, filed May 18, 1964, now abandoned.

Our invention relates to the art of cleaning and descaling an open water system, as found, for example in a dwelling or other building, for supplying water to a hot water heater, and humidifier, or air conditioner, as well as for cooking, drinking, bathing, etc.

BACKGROUND OF THE INVENTION

Field of the invention

In practically all water supply systems some solids are present in solution, the proportion thereof depending upon the degree of hardness of the ground or surface water employed in a particular system. Such solids tends to precipitate from solution as the temperature of the water is raised, forming a deposit known as "scale" on the surface of the tank, coil or conduit through which the water passes. Unless such scale is periodically removed, the efficiency of the system will be seriously reduced. Hence, it becomes a problem to remove such deposit in the most expedient way, without injury to the equipment or to operating personnel.

Our invention has especially to do with a so-called "open" system for supplying water. Such a system is distinguished from a closed system which is exemplified by a steam or hot water heating system or an industrial system for supplying water to boilers, etc.

In a closed system, from which water is never withdrawn for potable or other use in or on the human body, it is immaterial whether or not the descaling composition is toxic to any degree whatever. Nor is it of any importance whether or not the materials used for descaling are objectionable for any other reason if allowed to come into communication with people.

On the other hand, in the descaling of an open system it is a matter of highest importance that the materials used should be non-toxic in or on the human organism, that they do not produce irritating fumes, or have any other objectionable characteristics if imbibed by humans or allowed to come in contact with the body.

THE PRIOR ART

Muriatic acid (an industrial grade of hydrochloric acid), because of low cost and ready availability, has long been employed for descaling an industrial or other closed water system. Such material is utterly unsuitable for use in an open system for many reasons. In the first place, such an acid is extremely toxic because of impurities such as arsenic, always found therein, and is further objectionable because of fuming, etc.

A typical illustration of such a descaling composition and method is disclosed in Garbarino Patent No. 1,582,974, dated May 4, 1926, disclosing the descaling of an industrial system by means of an aqueous solution of hydrochloric acid, copper sulphate and sodium sulphate. Obviously, such material would be unthinkable for use in any open system wherein the likelihood of withdrawing a portion of the descaling solution for potable purposes must be considered a possibility.

Another example of a descaling method and material for a closed system is found in Battistella Patent No. 1,892,093, dated Dec. 27, 1932. This patent deals with removal of rust and scale from hot water heating systems and suggests circulating through such a system, first, a solution consisting of phosphoric acid, acetic acid, secondary butanol and alcohol. After circulation and draining of this material, the system is then flushed with a one percent solution of butyric acid. Alternatively, butyric acid might be substituted for the acetic acid in the first solution and acetic acid substituted for the butyric in the second solution. Thus, it is apparently essential in the Battistella process that acetic acid be employed at some time in the course of the operation as well as the other ingredients mentioned.

A condition mentioned as essential in the Battistella process is that the system must preliminarily be completely flushed out and air scavenged in order to remove all vestiges of water "which if present would dilute and render less effective the solution used in the next step." Thus, it is evident that Battistella requires the use of anhydrous materials.

Comparative tests which we have conducted clearly show that, in the treatment of identical badly scaled tubing by our process and that of Battistella, in the period of time required for substantially complete descaling by our process, treatment by the Battistella procedure and materials results in a practically unappreciable amount of descaling. This patentee states that the main circulation step takes up to eight hours, depending on the degree of scaling, whereas our method requires only about 45 minutes under the worst condition of scaling.

Furthermore, considering that Battistella's claim 2 specifies only a phosphoric acid solution for descaling a closed piping system, although inconsistent with his specification in this regard, our tests reveal that the use of commercial phosphoric acid alone results in no more effective descaling than the complete Battistella formula.

Accordingly, to the best of our knowledge and belief, nothing in the prior art suggests as an effective descaling material, suitable for treating an open system, any material which would be sufficiently efficient for the purpose and commercially acceptable in the other essential characteristics mentioned herein.

SUMMARY OF THE INVENTION

We have discovered, after extensive testing, that scale may efficiently be removed in an open system by an improved method and means which is completely safe to handle, even for a technically unskilled person, which will be non-fuming and will have no substantial corrosive effect on the equipment, even if allowed to remain in the system for an extended period longer than necessary to accomplish the purpose, which is substantially odorless and free from objectionable fumes, and which will have no deleterious effects on the body if ingested or allowed to contact the skin, even in substantial quantities. Lack of fuming is of considerable importance, inasmuch as the operation is usually carried out in a confined area without adequate ventilation.

We have found as an apparently ideal solution of the problem that an open water system may effectively be descaled by circulating through the system a relatively dilute aqueous solution of phosphoric acid.

We have further found that the addition of other constituents to the solution, such as inhibitors and the like, such as are frequently found in previously known descaling compositions, as in Battistella, supra, only serves to retard the operation and render it less efficient.

Phosphoric acid is found to be ideal from many standpoints. Of primary importance is the fact that this material is so lacking in toxicity that it is commonly employed in the commercial manufacture of many food and bakery products. Furthermore, it is practically odorless and non-fuming, and is readily available at such low cost that the process according to our invention is inexpensive.

PREFERRED EMBODIMENTS

Example 1

Especially suitable for any open water system, we use an industrial grade of phosphoric acid, usually available in concentrations of approximately 75 to 85 percent $H_3PO_4$ in water, in the following approximately quantities:

300 cc. acid of above concentration
700 cc. water.

Thus, according to this formula, we have approximately 23 percent $H_3PO_4$ in the treating solution.

Example 2

Especially for treating water heaters, we employ 230 cc. of commercial grade phosphoric acid to 770 cc. water, making for a concentration of about 17–20 percent $H_3PO_4$ in the solution as employed in our treating process.

Example 3

Especially suitable for descaling domestic humidifiers, we preferably employ an aqueous solution containing about 13–15 percent $H_3PO_4$.

While these concentrations give the optimum results, we find it entirely practical to use from about 7 to about 45 percent of pure phosphoric acid in the treating composition.

Procedure.—The system is drained by removing the usual drain plug or valve. No flushing or air-purging or the like, as required by Battistella (supra), is necessary in our invention.

Our treating solution as described above is introduced into the system after such simple draining and is either allowed to stand or is force-circulated therethrough.

An acid pump may be employed, using any nonmetallic open container as the primary reservoir for the solution. Such procedure would not be feasible with presently used materials without special precautions to guard against fumes, etc. Our improved composition causes no substantial damage to pumps and conduits used for circulation.

Our preferred procedure requires about 45 minutes for descaling a badly scaled system.

Our treating material may be conveniently stored for re-use in non-metallic containers with no inconvenience.

While not essential to our invention, we preferably include in our treating solution a small percentage of any suitable acid-alkali indicator such as thymol blue or cresol red to show when the material is so depleted as to be unfit for further use. Such indicators in the quantities employed are non-toxic and serve incidentally to identify the product.

Various changes coming within the spirit of our invention may suggest themselves to those skilled in the art; hence, we do not wish to be limited to the specific embodiments shown and described or uses mentioned, but intend the same to be merely exemplary, the scope of our invention being limitetd only by the appended claims.

We claim:
1. A method of descaling an open water system from which fluid is subject to withdrawal for use in and on the human body, said method consisting of
   (a) draining the system,
   (b) introducing therein a solution consisting essentially of phosphoric acid and water, the concentration of phosphoric acid being within the approximate range of 7 to 45 percent of said solution,
   (c) allowing said solution to remain in the system a sufficient length of time to loosen the scale, and
   (d) eliminating the solution and foreign matter from the system.
2. A method as in claim 1, wherein the solution is circulated through the system.
3. A method as in claim 1, wherein the solution consists essentially of phosphoric acid in a concentration of about 23 percent.
4. A method as in claim 3, wherein the solution also contains a minor quantity of an acid-alkali indicator.
5. A method as in claim 1, wherein the solution consists essentially of phosphoric acid in a concentration of about 17–20 percent.
6. A method as in claim 1, wherein the solution consists essentially of phosphoric acid in a concentration of about 13–15 percent.

References Cited

UNITED STATES PATENTS

| | | | |
|---|---|---|---|
| 1,582,974 | 5/1926 | Garbarino | 252—142 XR |
| 1,892,093 | 12/1932 | Battistella | 134—22 XR |
| 2,994,664 | 8/1961 | Wachter | 252—136 XR |

LEON D. ROSDOL, *Primary Examiner.*

W. SCHULZ, *Assistant Examiner.*

U.S. Cl. X.R.

252—136, 142, 175; 134—3, 22